United States Patent
Wang et al.

(10) Patent No.: US 11,064,384 B2
(45) Date of Patent: Jul. 13, 2021

(54) APPARATUSES AND METHODS FOR MULTIPATH COMMUNICATIONS USING A PLURALITY OF WIRELESS TECHNOLOGIES

(71) Applicant: MEDIATEK INC., Hsinchu (TW)

(72) Inventors: Fang-Ru Wang, Hsinchu (TW); Wei-Hsuan Lien, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 174 days.

(21) Appl. No.: 16/554,694

(22) Filed: Aug. 29, 2019

(65) Prior Publication Data
US 2020/0267589 A1 Aug. 20, 2020

Related U.S. Application Data

(60) Provisional application No. 62/807,262, filed on Feb. 19, 2019.

(51) Int. Cl.
| | |
|---|---|
| *H04W 28/02* | (2009.01) |
| *H04W 72/04* | (2009.01) |
| *H04L 12/707* | (2013.01) |
| *H04L 12/26* | (2006.01) |

(52) U.S. Cl.
CPC ..... *H04W 28/0236* (2013.01); *H04L 43/0882* (2013.01); *H04L 43/16* (2013.01); *H04L 45/24* (2013.01); *H04W 72/048* (2013.01); *H04W 72/0446* (2013.01)

(58) Field of Classification Search
CPC ........... H04W 28/0236; H04W 72/048; H04W 72/0446; H04W 76/15; H04W 28/0289; H04W 88/02; H04L 45/24; H04L 43/16; H04L 43/0882; H04L 43/0852
See application file for complete search history.

(56) References Cited

U.S. PATENT DOCUMENTS

| | | | | |
|---|---|---|---|---|
| 10,892,804 | B2 * | 1/2021 | Hedayat | H04B 7/0404 |
| 2017/0188407 | A1 * | 6/2017 | Zee | H04W 36/0027 |
| 2018/0184474 | A1 * | 6/2018 | Skog | H04W 76/15 |
| 2019/0273809 | A1 * | 9/2019 | Boucadair | H04L 69/18 |
| 2019/0386911 | A1 * | 12/2019 | Zhu | H04L 47/621 |
| 2021/0068094 | A1 * | 3/2021 | Chen | H04W 72/0406 |

FOREIGN PATENT DOCUMENTS

CN 108540380 A 9/2018

* cited by examiner

*Primary Examiner* — Habte Mered

(74) *Attorney, Agent, or Firm* — McClure, Qualey & Rodack, LLP

(57) ABSTRACT

A wireless communication device including two wireless transceivers and a controller is provided. The first and second wireless transceivers provide a first connection and a second connection for wireless transmission and reception using a first wireless technology and a second wireless technology, respectively. The controller determines a first period of time from reception of a request for transmitting a packet transmission of a data flow by the first wireless transceiver to a start of the packet transmission over the first connection via the first wireless transceiver, or a second period of time from reception of the request for transmitting the packet of the data flow by the first wireless transceiver to reception of the packet by a router, and activates a multipath communication protocol, based on the first or second period of time, for transmitting subsequent packets of the data flow over both the first and second connections.

20 Claims, 7 Drawing Sheets

APPARATUSES AND METHODS FOR MULTIPATH COMMUNICATIONS USING A PLURALITY OF WIRELESS TECHNOLOGIES

CROSS REFERENCE TO RELATED APPLICATIONS

This Application claims priority of U.S. Provisional Application Ser. No. 62/807,262, filed on Feb. 19, 2019, the entirety of which is incorporated by reference herein.

BACKGROUND OF THE APPLICATION

Field of the Application

The application generally relates to wireless communications, and more particularly, to apparatuses and methods for multipath communications using a plurality of wireless technologies.

Description of the Related Art

With growing demand for ubiquitous computing and networking, various wireless technologies have been developed, including telecommunication technologies and Short-Range Wireless (SRW) technologies. For example, telecommunication technologies may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and fifth generation (5G) New Radio (NR) technology, and others. SRW technologies may include Wireless-Fidelity (Wi-Fi) technology, Bluetooth (BT) technology, and Zigbee technology, etc.

Nowadays, a wireless communication device, such as a mobile phone, a tablet, etc., may support multiple wireless technologies, to provide a user the flexibility of mobile communications at all times via the supported wireless technologies, regardless of his/her geographic location. Taking a mobile phone supporting LTE technology and Wi-Fi technology as an example, the mobile phone may have a single data transmission link over an LTE connectivity or a Wi-Fi connectivity, or the mobile phone may have multiple data transmission links over both the LTE connectivity and the Wi-Fi connectivity. Such a mobile phone may employ the single-link mode of communications when one of the LTE connectivity and the Wi-Fi connectivity is able to provide sufficient bandwidth or guaranteed delay, and may switch to the multilink mode of communications when the single data transmission link can no longer satisfy the bandwidth and/or delay requirements due to link deterioration or network congestion.

In conventional practices, the Round-Trip Time (RTT) or the packet loss rate of the single-link mode of communications is used to decide if the mobile phone should switch from the single-link mode of communications to the multilink mode of communications. However, the RTT or packet loss rate can only be determined long after link deterioration or network congestion has occurred.

FIG. 1 is a schematic diagram illustrating the RTT over an LTE connectivity. As shown in FIG. 1, the RTT includes four periods of time T1~T4, wherein the first period of time T1 indicates how long it takes for a signal or a packet to be sent from the mobile phone to the first base station of the LTE network, the second period of time T2 indicates how long it takes for the signal/packet to be sent from the first base station of the LTE network to the receiver, the third period of time T3 indicates how long it takes for an acknowledgment (ACK) of the signal/packet to be sent from the receiver to the first base station of the LTE network, and the fourth period of time T4 indicates how long it takes for the ACK to be sent from the first base station of the LTE network to the mobile phone.

As a result, it may take a long time for the mobile phone to realize that link deterioration or network congestion has occurred, and until then, the mobile phone just stays in the single-link mode of communications which may suffer from long delay and/or limited bandwidth.

BRIEF SUMMARY OF THE APPLICATION

In order to solve the aforementioned problem, the present application proposes to use a local delay time within a wireless communication device to control the activation of the multipath communication protocol, so that the multipath communication protocol may be activated as early as possible when link deterioration or network congestion has occurred.

In one aspect of the application, a wireless communication device comprising a first wireless transceiver, a second wireless transceiver, and a controller is provided. The first wireless transceiver is configured to provide a first connection for wireless transmission and reception using a first wireless technology. The second wireless transceiver is configured to provide a second connection for wireless transmission and reception using a second wireless technology. The controller is configured to determine a first period of time from reception of a request for transmitting a packet of a data flow by the first wireless transceiver to a start of the packet transmission over the first connection via the first wireless transceiver, or a second period of time from reception of the request for transmitting the packet of the data flow by the first wireless transceiver to reception of the packet by a router, and activate a multipath communication protocol, based on the first period of time or the second period of time, for transmitting subsequent packets of the data flow over both the first connection and the second connection.

In another aspect of the application, a wireless communication device comprising a wireless transceiver and a controller is provided. The wireless transceiver is configured to provide a first connection and a second connection for wireless transmission and reception using a first wireless technology and a second wireless technology, respectively. The controller is configured to determine a first period of time from reception of a request for transmitting a packet of a data flow by the wireless transceiver to a start of the packet transmission over the first connection via the wireless transceiver, or a second period of time from reception of the request for transmitting the packet of the data flow by the first wireless transceiver to reception of the packet by a router, and activate a multipath communication protocol, based on the first period of time or the second period of time, for transmitting subsequent packets of the data flow over both the first connection and the second connection.

In yet another aspect of the application, a method for multipath communications using a plurality of wireless technologies, executed by a wireless communication device comprising a wireless transceiver, is provided. The method comprises the steps of: determining a first period of time from reception of a request for transmitting a packet of a data flow by the wireless transceiver to a start of the packet transmission over a first connection via the wireless transceiver, or a second period of time from reception of the request for transmitting the packet of the data flow by the first wireless transceiver to reception of the packet by a router; and activating a multipath communication protocol, based on the first period of time or the second period of time, for transmitting subsequent packets of the data flow over both the first connection and a second connection, wherein the first connection and the second connection are established using different wireless technologies.

Other aspects and features of the present application will become apparent to those with ordinarily skill in the art upon review of the following descriptions of specific embodiments of the wireless communication devices and the methods for multipath communications using a plurality of wireless technologies.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
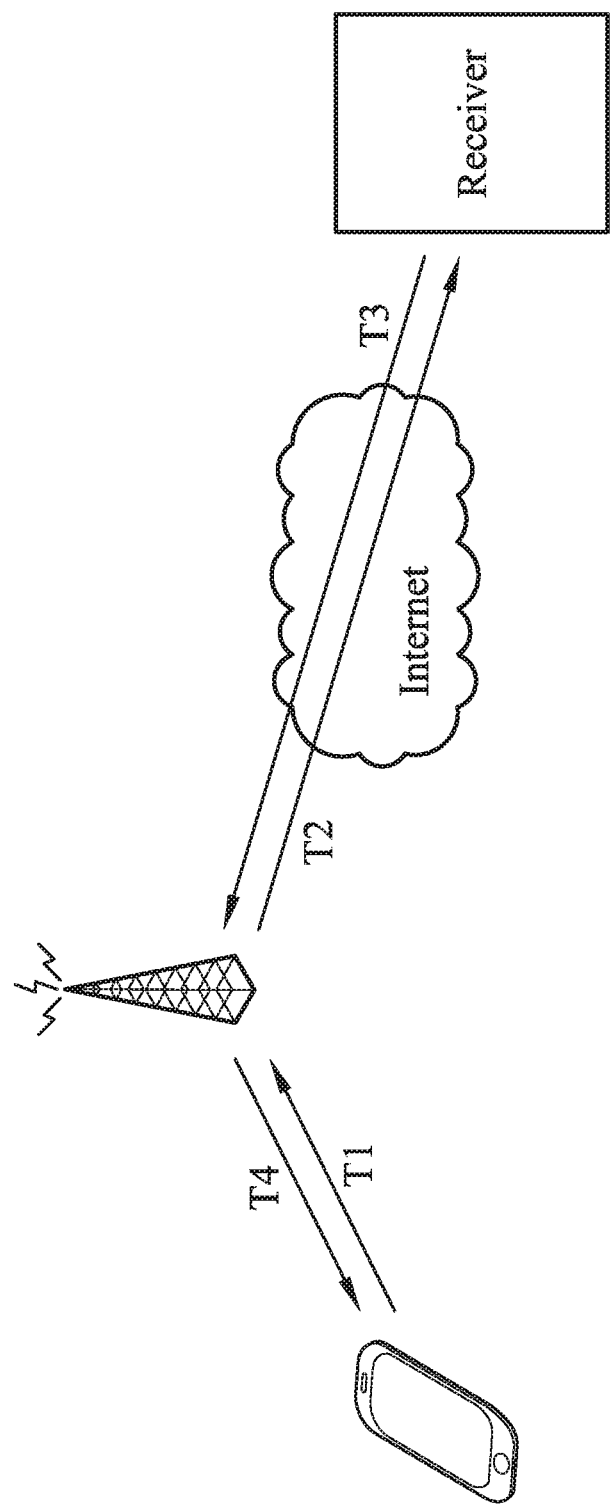
FIG. 1 is a schematic diagram illustrating the RTT over an LTE connectivity.
Figure 2:
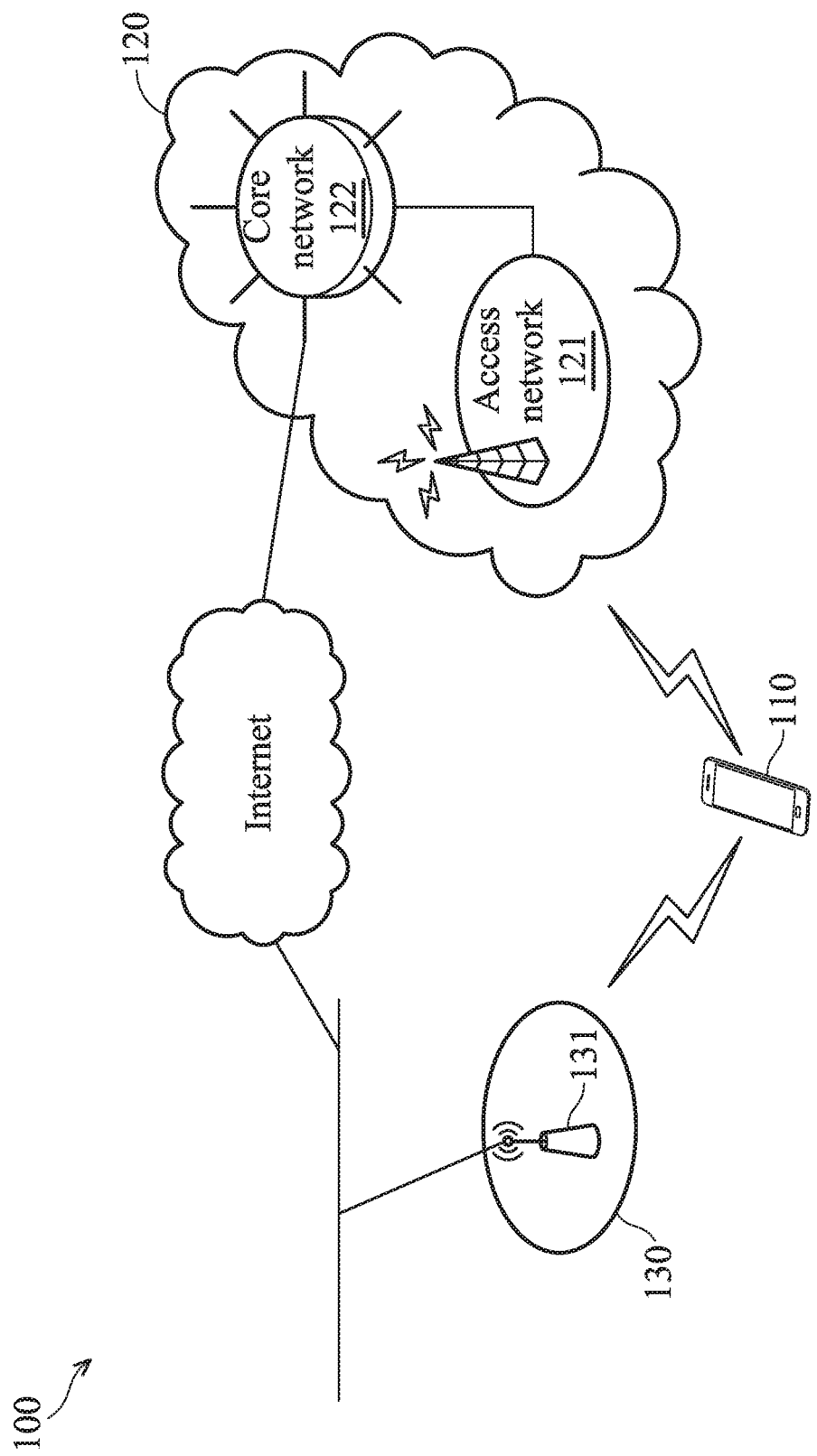
FIG. 2 is a block diagram of a wireless communication environment according to an embodiment of the application.

FIG. 2 is a block diagram of a wireless communication environment according to an embodiment of the application.

As shown in FIG. 2, the wireless communication environment 100 includes a wireless communication device 110 and two service networks 120 and 130.

The wireless communication device 110 may be referred to as a User Equipment (UE) or Mobile Station (MS), such as a feature phone, a smartphone, a panel Personal Computer (PC), a laptop computer, or any computing device supporting the wireless technologies utilized by the service networks 120 and 130.

The wireless communication device 110 may wirelessly communicate with the service network 120 and/or the service network 130 for obtaining wireless services. For example, the wireless communication device 110 may connect to one of the service networks 120 and 130 (i.e., in the single-link mode of communications), and may connect to both the service networks 120 and 130 to enter the multilink mode of communications.

The service network 120 may be a telecommunication network, e.g., a 2G network (e.g., GSM/GPRS/EDGE/IS-95 network), a 3G network (e.g., WCDMA/CDMA-2000/TD-SCDMA network, a 4G network (e.g., LTE/LTE-A/TD-LTE network), or a 5G NR network.

Specifically, the service network 120 may include an access network 121 and a core network 122. The access network 121 is responsible for processing radio signals, terminating radio protocols, and connecting the wireless communication device 110 with the core network 122, while the core network 122 is responsible for performing mobility management, network-side authentication, and interfaces with public/external networks (e.g., the Internet).

The access network 121 and the core network 122 may each include one or more network nodes for carrying out said functions. For example, if the service network 120 is a GSM/GPRS/EDGE network, the access network 121 may be a GSM EDGE Radio Access Network (GERAN) which includes a Base Transceiver Station (BTS) and/or a Base Station Controller (BSC), and the core network 122 may be a GPRS core which includes a Mobile Switching Center (MSC), Home Location Register (HLR), Serving GPRS Support Node (SGSN), and/or Gateway GPRS Support Node (GGSN).

If the service network 120 is a WCDMA network, the access network 121 may be a Universal Terrestrial Radio Access Network (UTRAN) and the core network 122 may be a General Packet Radio Service (GPRS) core which includes a Home Location Register (HLR), Serving GPRS Support Node (SGSN), and/or Gateway GPRS Support Node (GGSN).

If the service network 120 is an LTE-based network (e.g., LTE/LTE-A/TD-LTE network), the access network 121 may be an Evolved-UTRAN (E-UTRAN) which includes at least an evolved NB (eNB) (e.g., a macro eNB, femto eNB, or pico eNB), and the core network 122 may be an Evolved Packet Core (EPC) which includes a Home Subscriber Server (HSS), Mobility Management Entity (MME), Serving Gateway (S-GW), Packet Data Network Gateway (PDN-GW or P-GW), and/or IP Multimedia Subsystem (IMS) server.

If the service network 120 is a 5G NR network, the access network 121 may be a Next-Generation Radio Access Network (NG-RAN) which includes a gNB and/or Transmission Reception Point (TRP), and the core network 122 may be a Next-Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and/or User Data Management (UDM), wherein each network function may be implemented as a network element on a dedicated hardware, or as a software instance running on a dedicated hardware, or as a virtualized function instantiated on an appropriate platform, e.g., a cloud infrastructure.

The service network 130 may be a Wireless Local Area Network (WLAN) utilizing a Short-Range Wireless (SRW) technology, such as the Wi-Fi technology, the BT technology, or the Zigbee technology.

For example, the service network 130 may be formed by an Access Point (AP) 131. Specifically, the AP 131 may connect to a local area network by an Ethernet cable, and it typically receives, buffers, and transmits data traffic which is to be directed to and from the wireless communication device 110. If the AP 131 utilizes the Wi-Fi technology, it may have, on average, a coverage varying from 20 meters in an area with obstacles (walls, stairways, elevators, etc.) to 100 meters in an area with a clear line of sight.

It should be understood that the wireless communication environment 100 described in the embodiment of FIG. 2 are for illustrative purposes only and are not intended to limit the scope of the application. For example, both the service networks 120 and 130 may be telecommunication networks or may be WLANs.

Figure 3:
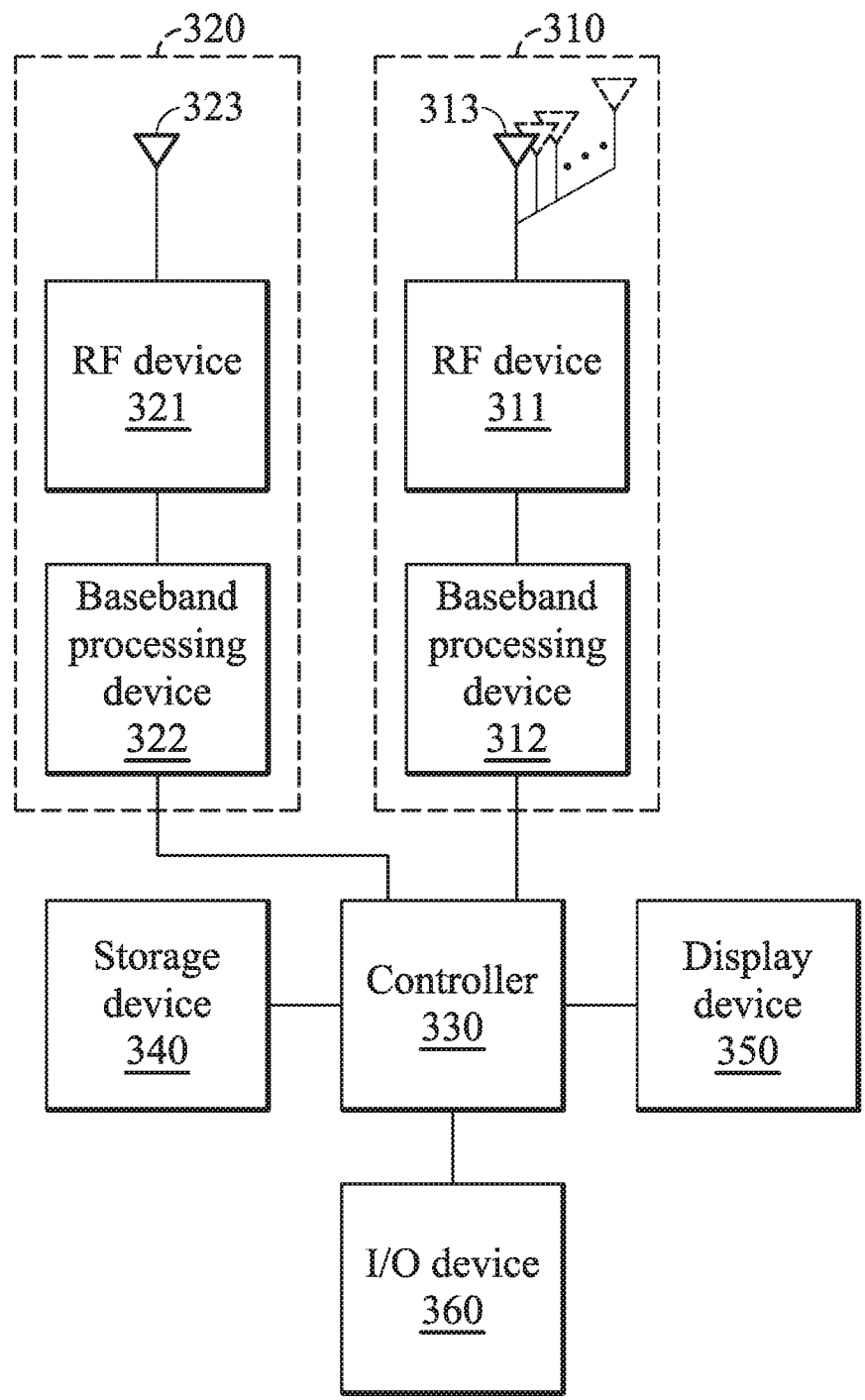
FIG. 3 is a block diagram illustrating a wireless communication device according to an embodiment of the application.

FIG. 3 is a block diagram illustrating a wireless communication device according to an embodiment of the application.

As shown in FIG. 3, a wireless communication device (e.g., the wireless communication device 110) may include two wireless transceivers 310 and 320, a controller 330, a storage device 340, a display device 350, and an Input/Output (I/O) device 360.

The wireless transceiver 310 is configured to perform wireless transmission and reception to and from the service network 120. In one embodiment, the wireless transceiver 310 may be configured to provide a connection for wireless transmission and reception using the wireless technology utilized by the service network 120.

Specifically, the wireless transceiver 310 may include a Radio Frequency (RF) device 311, a baseband processing device 312, and antenna 313, wherein the antenna 313 may include an antenna array for beamforming.

The baseband processing device 312 is configured to perform baseband signal processing and control the communications between subscriber identity card(s) (not shown) and the RF device 311. The baseband processing device 312 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 311 may receive RF wireless signals via the antenna 313, convert the received RF wireless signals to baseband signals, which are processed by the baseband processing device 312, or receive baseband signals from the baseband processing device 312 and convert the received baseband signals to RF wireless signals, which are later transmitted via the antenna 313. The RF device 311 may also contain multiple hardware devices to perform radio frequency conversion. For example, the RF device 311 may include a mixer to multiply the baseband signals with a carrier oscillated in the radio frequency of the supported wireless technologies, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 850 MHz, 1900 MHz, or 2100 MHz utilized in CDMA-2000 systems, or may be 900 MHz, 2100 MHz, or 2.6 GHz utilized in LTE/LTE-A/TD-LTE systems, or may be any radio frequency (e.g., 30 GHz~300 GHz for mmWave) utilized in 5G NR systems, or another radio frequency, depending on the wireless technology in use.

The wireless transceiver 320 is configured to perform wireless transmission and reception to and from the service network 130. In one embodiment, the wireless transceiver 320 may be configured to provide a connection for wireless transmission and reception using the wireless technology utilized by the service network 130.

Specifically, the wireless transceiver 320 may include an RF device 321, a baseband processing device 322, and an antenna 323.

The baseband processing device 322 is configured to perform baseband signal processing. The baseband processing device 322 may contain multiple hardware components to perform the baseband signal processing, including ADC/DAC, gain adjusting, modulation/demodulation, encoding/decoding, and so on.

The RF device 321 may receive RF wireless signals via the antenna 323, convert the received RF wireless signals to baseband signals, which are processed by the baseband processing device 322, or receive baseband signals from the baseband processing device 322 and convert the received baseband signals to RF wireless signals, which are later transmitted via the antenna 323. The RF device 321 may also contain multiple hardware devices to perform radio frequency conversion. For example, the RF device 321 may include a mixer to multiply the baseband signals with a carrier oscillated in the radio frequency of the supported wireless technologies, wherein the radio frequency may be 2.4 GHz or 5 GHz utilized in Wi-Fi systems, or may be 2.4 GHz utilized in BT/Zigbee systems, or another radio frequency, depending on the wireless technology in use.

The controller 330 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 310 for wireless communications with the service network 120, controlling the wireless transceiver 320 for wireless communications with the service network 130, storing and retrieving data (e.g., program code) to and from the storage device 340, sending a series of frame data (e.g. representing text messages, graphics, images, etc.) to the display device 350, and receiving user inputs or outputting signals via the I/O device 360.

In particular, the controller 330 coordinates the aforementioned operations of the wireless transceivers 310 and 320, the storage device 340, the display device 350, and the I/O device 360 for performing the method for multipath communications using a plurality of wireless technologies.

In another embodiment, the controller 330, the baseband processing device 312, and/or the baseband processing device 322 may be integrated into one or more processors.

As will be appreciated by persons skilled in the art, the circuits of the controller 30 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 340 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method for multipath communications using a plurality of wireless technologies.

The display device 350 may be a Liquid-Crystal Display (LCD), a Light-Emitting Diode (LED) display, an Organic LED (OLED) display, or an Electronic Paper Display (EPD), etc., for providing a display function. Alternatively, the display device 350 may further include one or more touch sensors disposed thereon or thereunder for sensing touches, contacts, or approximations of objects, such as fingers or styluses.

The I/O device 360 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 3 are for illustrative purposes only and are not intended to limit the scope of the application. For example, a wireless communication device may include more components, such as a power supply, and/or a Global Positioning System (GPS) device, wherein the power supply may be a mobile/replaceable battery providing power to all the other components of the wireless communication device, and the GPS device may provide the location information of the wireless communication device for use by some location-based services or applications. Alternatively, a wireless communication device may include fewer components. For example, a wireless communication device may not include the display device 350 and/or the I/O device 360.

Figure 4:
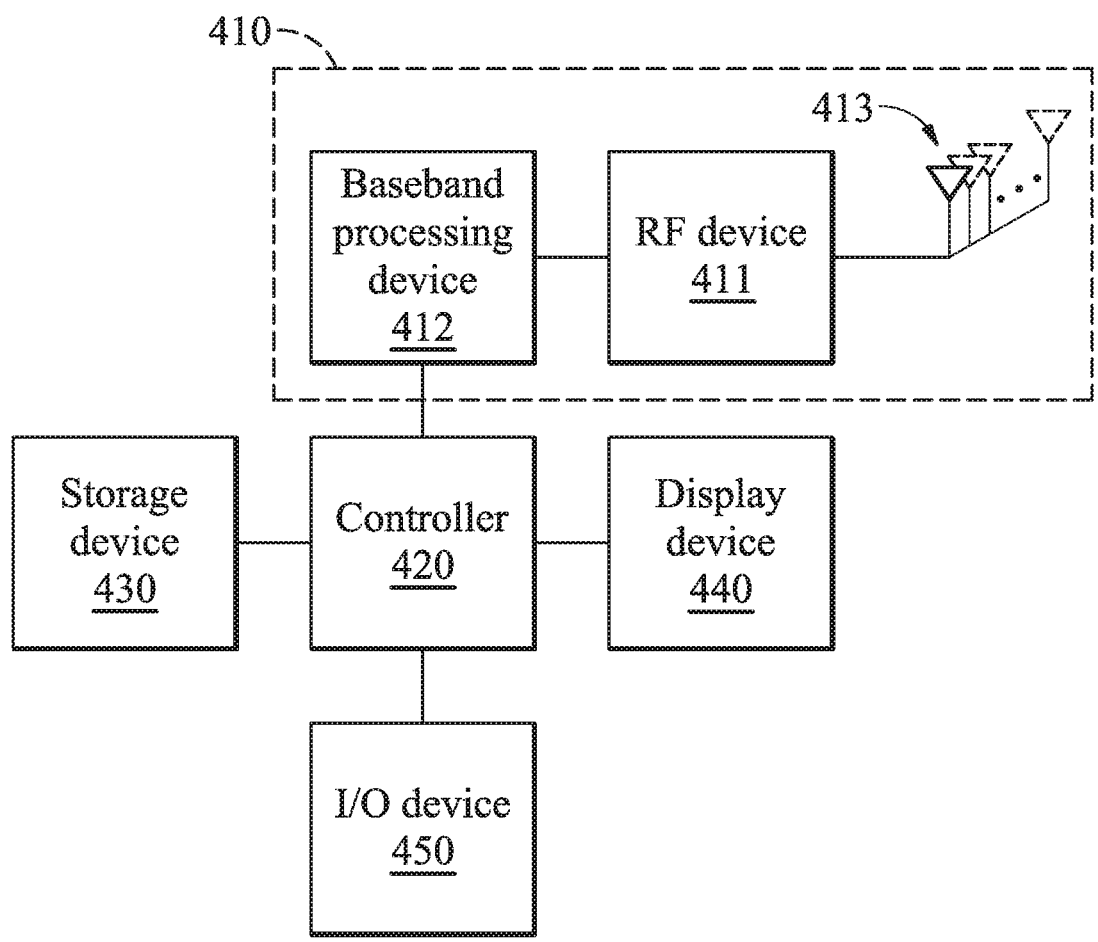
FIG. 4 is a block diagram illustrating a wireless communication device according to another embodiment of the application.

FIG. 4 is a block diagram illustrating a wireless communication device according to another embodiment of the application.

As shown in FIG. 4, a wireless communication device (e.g., the wireless communication device 110) may include a single wireless transceiver 410, a controller 420, a storage device 430, a display device 440, and an I/O device 450.

The wireless transceiver 410 is configured to perform wireless transmission and reception to and from the service networks 120 and 130. In one embodiment, the wireless transceiver 410 may be configured to provide a first connection for wireless transmission and reception using the wireless technology utilized by the service network 120, and to provide a second connection for wireless transmission and reception using the wireless technology utilized by the service network 130.

Specifically, the wireless transceiver 410 may include an RF device 411, a baseband processing device 412, and an antenna 413, wherein the antenna 413 may include an antenna array for beamforming.

The baseband processing device 412 is configured to perform baseband signal processing. The baseband processing device 412 may contain multiple hardware components to perform the baseband signal processing, including ADC/DAC, gain adjusting, modulation/demodulation, encoding/decoding, and so on.

The RF device 411 may receive RF wireless signals via the antenna 413, convert the received RF wireless signals to baseband signals, which are processed by the baseband processing device 412, or receive baseband signals from the baseband processing device 412 and convert the received baseband signals to RF wireless signals, which are later transmitted via the antenna 413. The RF device 411 may also contain multiple hardware devices to perform radio frequency conversion. For example, the RF device 411 may include a mixer to multiply the baseband signals with a carrier oscillated in the radio frequency of the supported wireless technologies, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 850 MHz, 1900 MHz, or 2100 MHz utilized in CDMA-2000 systems, or may be 900 MHz, 2100 MHz, or 2.6 GHz utilized in LTE/LTE-A/TD-LTE systems, or may be any radio frequency (e.g., 30 GHz~300 GHz for mmWave) utilized in 5G NR systems, or may be 2.4 GHz or 5 GHz utilized in Wi-Fi systems, or may be 2.4 GHz utilized in BT/Zigbee systems, or another radio frequency, depending on the wireless technology in use.

The controller 420 may be a general-purpose processor, an MCU, an application processor, a DSP, a GPU, an HPU, an NPU, or the like, which includes various circuits for providing the functions of data processing and computing, controlling the wireless transceiver 410 for wireless communications with the service networks 120 and 130, storing and retrieving data (e.g., program code) to and from the storage device 430, sending a series of frame data (e.g. representing text messages, graphics, images, etc.) to the display device 440, and receiving user inputs or outputting signals via the I/O device 450.

In particular, the controller 420 coordinates the aforementioned operations of the wireless transceiver 410, the storage device 430, the display device 440, and the I/O device 450 for performing the method for multipath communications using a plurality of wireless technologies.

In another embodiment, the controller 420 and the baseband processing device 412 may be integrated into one processor.

As will be appreciated by persons skilled in the art, the circuits of the controller 420 may typically include transistors that are configured in such a way as to control the operation of the circuits in accordance with the functions and operations described herein. As will be further appreciated, the specific structure or interconnections of the transistors may typically be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 430, the display device 440, and the I/O device 450 are similar to the storage device 340, the display device 350, and the I/O device 360, and thus, detailed description of the storage device 430, the display device 440, and the I/O device 450 is omitted herein for brevity.

It should be understood that the components described in the embodiment of FIG. 4 are for illustrative purposes only and are not intended to limit the scope of the application. For example, a wireless communication device may include more components (e.g., a power supply, and a GPS device), or may include fewer components (e.g., excluding the display device 440 and/or the I/O device 450).

Figure 5:
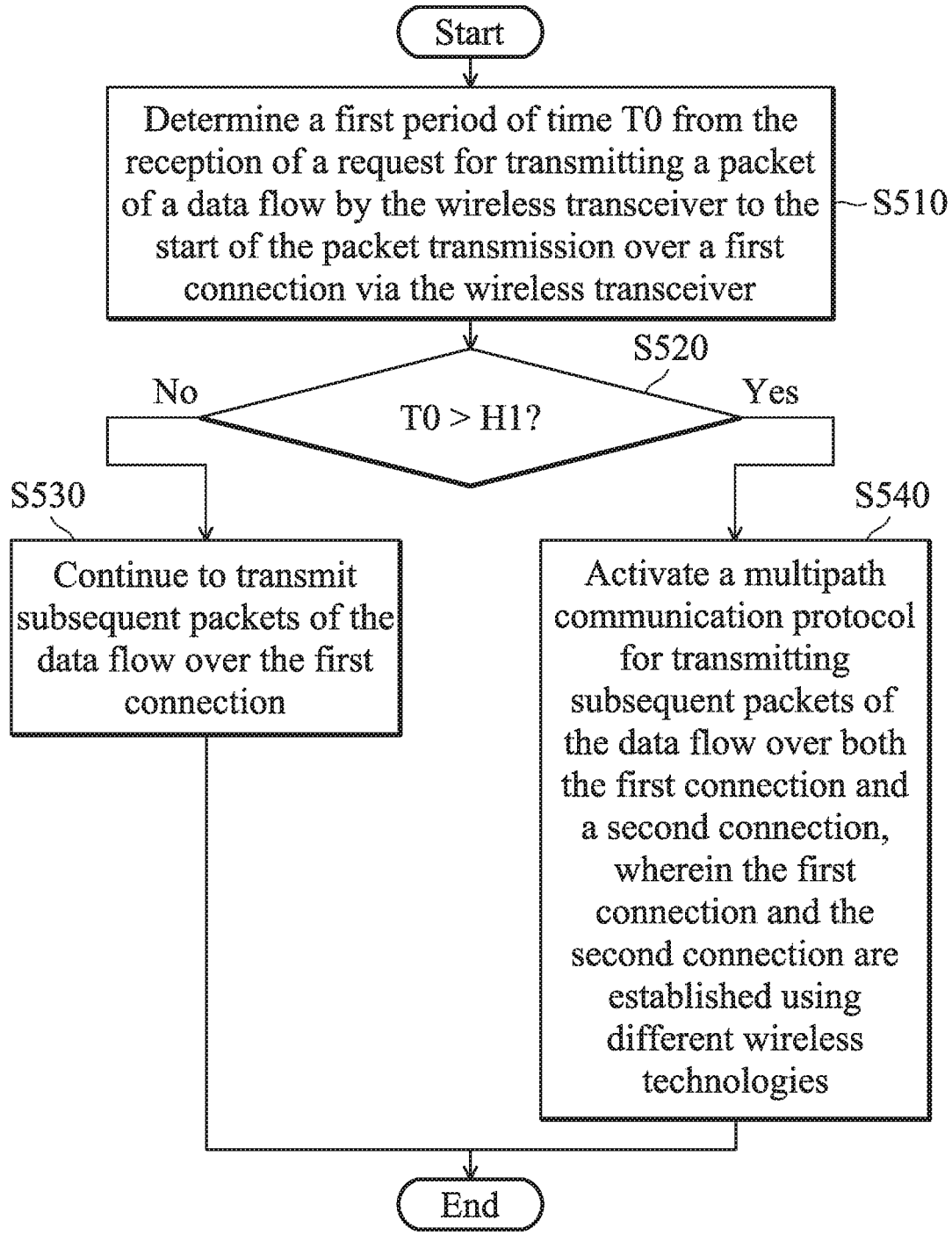
FIG. 5 is a flow chart illustrating the method for multipath communications using a plurality of wireless technologies according to an embodiment of the application.

FIG. 5 is a flow chart illustrating the method for multipath communications using a plurality of wireless technologies according to an embodiment of the application.

In this embodiment, the method for multipath communications using a plurality of wireless technologies is applied to and executed by a wireless communication device (e.g., the wireless communication device 110) including at least one wireless transceiver.

To begin with, the wireless communication device determines a first period of time T0 from the reception of a request for transmitting a packet of data flow by the wireless transceiver to the start of the packet transmission over a first connection via the wireless transceiver (step S510).

Assume that the wireless transceiver receives the request for transmitting the packet from the application layer at time t1, and that the wireless transceiver starts the packet transmission over the first connection at time t2. Then, the first period of time T0 may refer to the period of time between time t1 and time t2. That is, the first period of time T0 may be equal to t2 minus t1.

Specifically, the first period of time T0 may be determined according to at least one of the following parameters of the wireless transceiver: the availability of a channel suitable for the packet transmission, and the availability of a time slice configured for the packet transmission.

The availability of a channel suitable for the packet transmission may be associated with the state of a channel being idle or busy due to the operations of the wireless transceiver itself (e.g., the channel may be busy due to a channel scanning, roaming, or handover related procedure being ongoing, and the capability of the wireless transceiver may affect how long it takes to complete these operations that may keep the channel busy), or due to the air interface being occupied by other wireless communication devices (e.g., the channel may be busy due to contentions of the air interface by other wireless communication devices nearby).

The availability of a time slice configured for the packet transmission may be associated with the Time-Division Duplexing (TDD) operations of the wireless communications over the first connection.

Next, the wireless communication device determines whether the first period of time T0 is longer than a first predetermined threshold H1 (step S520).

Subsequent to step S520, if the first period of time T0 is not longer than the first predetermined threshold H1, the wireless communication device may continue to transmit subsequent packets of the data flow over the first connection (step S530).

Subsequent to step S520, if the first period of time T0 is longer than the first predetermined threshold H1, the wireless communication device may activate a multipath communication protocol for transmitting subsequent packets of the data flow over both the first connection and a second connection, wherein the first connection and the second connection are established using different wireless technologies (step S540).

The multipath communication protocol may be a MultiPath Transmission Control Protocol (MPTCP) or a MultiPath User Datagram Protocol (MPUDP).

In one embodiment, either the first connection or the second connection may be established using a telecommunication technology, such as an LTE-based technology (e.g., the LTE/LTE-A/TD-LTE technology), and the other of the first connection or the second connection may be established using an SRW technology, such as the Wi-Fi technology.

In another embodiment, both the first connection and the second connection may be established using the same or different telecommunication technologies, or may be established using the same or different SRW technologies.

Figure 6:
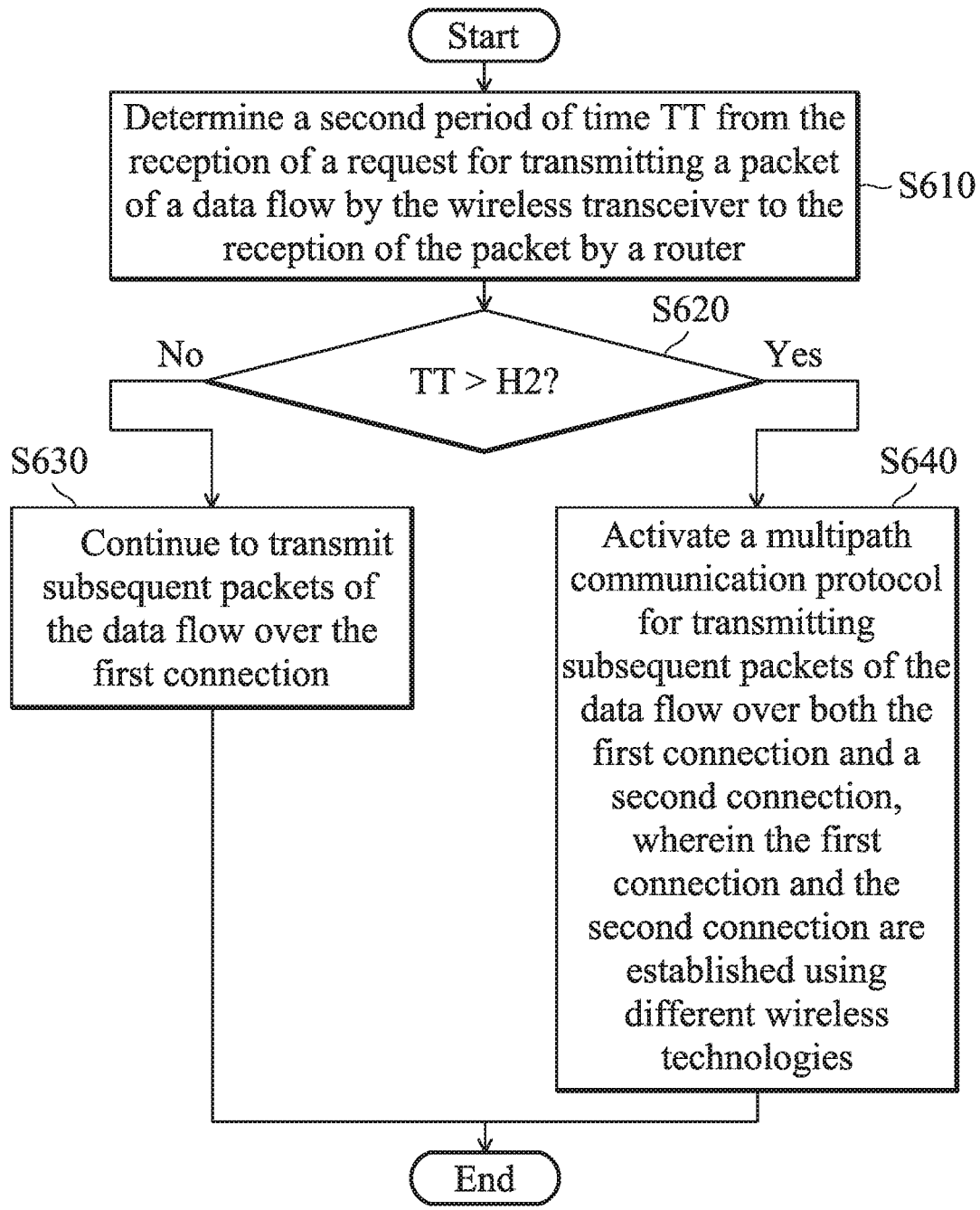
FIG. 6 is a flow chart illustrating the method for multipath communications using a plurality of wireless technologies according to another embodiment of the application.

FIG. 6 is a flow chart illustrating the method for multipath communications using a plurality of wireless technologies according to another embodiment of the application.

In this embodiment, the method for multipath communications using a plurality of wireless technologies is applied to and executed by a wireless communication device (e.g., the wireless communication device 110) including at least one wireless transceiver.

To begin with, the wireless communication device determines a second period of time TT from the reception of a request for transmitting a packet of a data flow by the wireless transceiver to the reception of the packet by a router (e.g., a gNB or a Wi-Fi AP) of the service network 120 or 130 (step S610).

Assume that the wireless transceiver receives the request for transmitting the packet from the application layer at time t1, and that the wireless transceiver is aware of the packet has arrived at a router of the service network 120 or 130 at time t3. Then, the second period of time TT may refer to the period of time between time t1 and time t3. That is, the second period of time TT may be equal to t3 minus t1.

Specifically, the time t3 may be the time when the wireless transceiver receives the acknowledgment of the packet from the router.

In one embodiment, the determination of the second period of time TT may include: determining a first period of time T0 from the reception of the request for transmitting the packet of data flow by the wireless transceiver to the start of the packet transmission over a first connection via the wireless transceiver, determining a third period of time T1 from the start of the packet transmission over the first connection via the wireless transceiver to the reception of the packet by the router (e.g., a gNB or a Wi-Fi AP) of the service network 120 or 130, and summing the first period of time T0 and the third period of time T1 to obtain the second period of time TT.

Assume that the wireless transceiver starts the packet transmission over the first connection at time t2, and that the wireless transceiver is aware of the packet has arrived at a router of the service network 120 or 130 at time t3. Then, the third period of time T1 may refer to the period of time between time t2 and time t3. That is, the third period of time T1 may be equal to t3 minus t2.

After that, the wireless communication device determines whether the second period of time TT is longer than a second predetermined threshold H2 (step S620).

Subsequent to step S620, if the second period of time TT is not longer than the second predetermined threshold H2, the wireless communication device may continue to transmit subsequent packets of the data flow over the first connection (step S630).

Subsequent to step S620, if the second period of time TT is longer than the second predetermined threshold H2, the wireless communication device may activate the multipath communication protocol for transmitting subsequent packets of the data flow over both the first connection and a second connection, wherein the first connection and the second connection are established using different wireless technologies (step S640).

Figure 7:
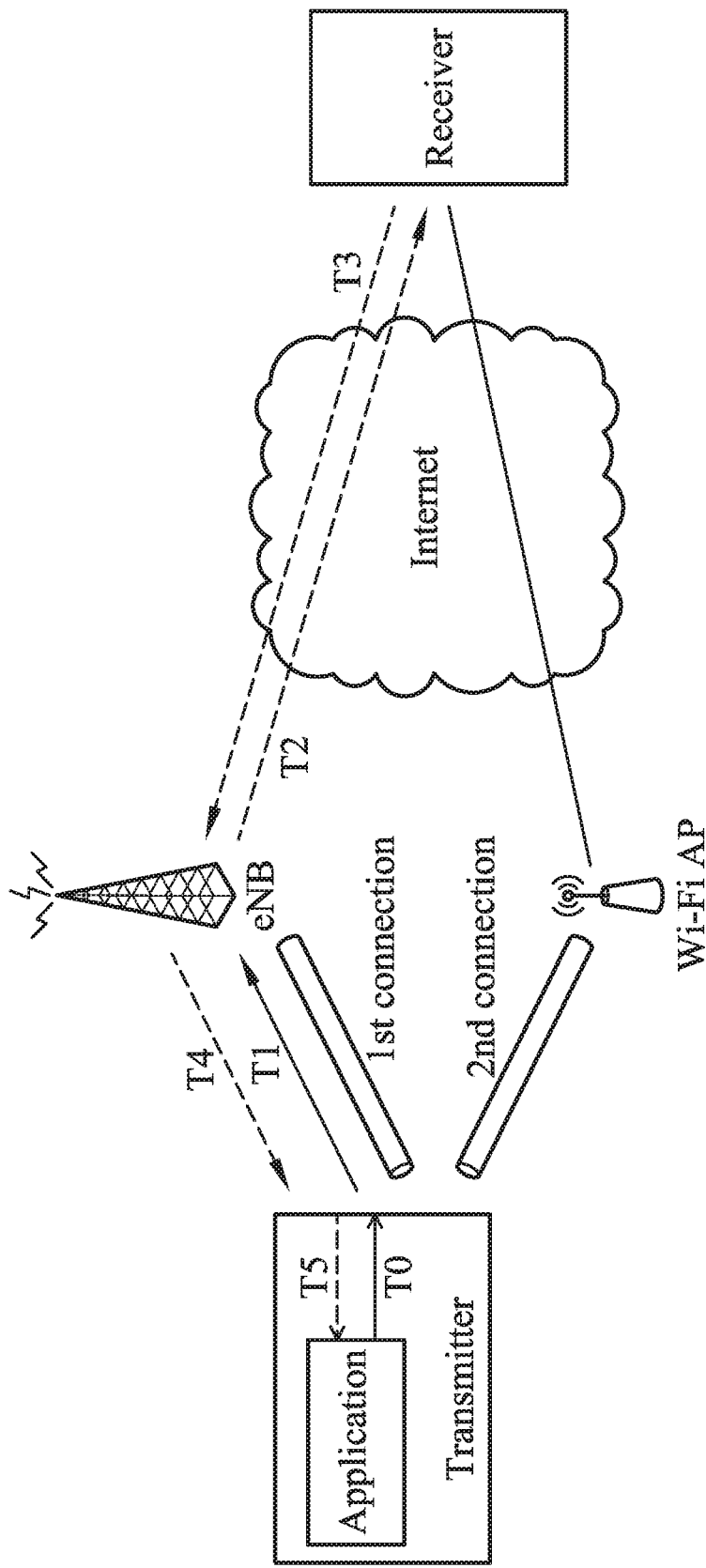
FIG. 7 is a schematic diagram illustrating the periods of time used for activating the multipath communication protocol according to an embodiment of the application.

FIG. 7 is a schematic diagram illustrating the periods of time used for activating the multipath communication protocol according to an embodiment of the application.

As shown in FIG. 7, a transmitter (e.g., the wireless communication device 110) may decide whether to activate the multipath communication protocol based on the first period of time T0, the third period of time T1, or a combination thereof (i.e., TT=T0+T1).

In one embodiment, the multipath communication protocol may be activated when the first period of time T0 is longer than the first predetermined threshold H1.

In another embodiment, the multipath communication protocol may be activated when the sum of the first period of time T0 and the third period of time T1 is longer than the second predetermined threshold H2.

Please note that the periods of time constituting the Round-Trip Time (RTT) of the packet delivery are denoted as T0 to T5 in FIG. 7, and in the present application, the activation of the multipath communication protocol may be triggered without waiting for the periods of time T2 to T5, or even may be triggered without waiting for the periods of time T1 to T5.

In view of the forgoing embodiments, it will be appreciated that the present application realizes early activation of the multipath communication protocol, by using the local delay time within a wireless communication device as the basis for triggering the multipath communication protocol. Advantageously, the multipath communication protocol may be activated as early as possible when link deterioration or network congestion has occurred, thereby improving transceiving throughput and delay.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A wireless communication device, comprising:
a first wireless transceiver, configured to provide a first connection for wireless transmission and reception using a first wireless technology;
a second wireless transceiver, configured to provide a second connection for wireless transmission and reception using a second wireless technology; and
a controller, configured to determine a first period of time from reception of a request for transmitting a packet of a data flow by the first wireless transceiver to a start of the packet transmission over the first connection via the first wireless transceiver, or a second period of time from reception of the request for transmitting the packet of the data flow by the first wireless transceiver to reception of the packet by a router, and activate a multipath communication protocol, based on the first period of time or the second period of time, for transmitting subsequent packets of the data flow over both the first connection and the second connection.

2. The wireless communication device of claim 1, wherein the activation of the multipath communication protocol is performed when the first period of time is longer than a first predetermined threshold or when the second period of time is longer than a second predetermined threshold.

3. The wireless communication device of claim 2, wherein, when the first period of time is not longer than the first predetermined threshold or when the second period of time is not longer than the second predetermined threshold, the controller is further configured to continue to transmit subsequent packets of the data flow over the first connection.

4. The wireless communication device of claim 1, wherein the controller is further configured to determine a third period of time from the start of the packet transmission over the first connection via the first wireless transceiver to reception of the packet by the router, and the second period of time is determined based on the sum of the first period of time and the third period of time.

5. The wireless communication device of claim 1, wherein the first period of time is determined according to at least one of the following parameters of the first wireless transceiver:
availability of a channel suitable for the packet transmission; and
availability of a time slice configured for the packet transmission.

6. The wireless communication device of claim 1, wherein the multipath communication protocol is a MultiPath Transmission Control Protocol (MPTCP) or a MultiPath User Datagram Protocol (MPUDP).

7. The wireless communication device of claim 1, wherein either the first wireless technology or the second wireless technology is a telecommunication technology, and the other of the first wireless technology or the second wireless technology is a Short-Range Wireless (SRW) technology.

8. The wireless communication device of claim 7, wherein the telecommunication technology is a Long Term Evolution (LTE)-based technology, and the SRW technology is a Wireless-Fidelity (Wi-Fi) technology.

9. A wireless communication device, comprising:
a wireless transceiver, configured to provide a first connection and a second connection for wireless transmission and reception using a first wireless technology and a second wireless technology, respectively; and
a controller, configured to determine a first period of time from reception of a request for transmitting a packet of a data flow by the wireless transceiver to a start of the packet transmission over the first connection via the wireless transceiver, or a second period of time from reception of the request for transmitting the packet of the data flow by the first wireless transceiver to reception of the packet by a router, and activate a multipath communication protocol, based on the first period of time or the second period of time, for transmitting subsequent packets of the data flow over both the first connection and the second connection.

10. The wireless communication device of claim 9, wherein the activation of the multipath communication protocol is performed when the first period of time is longer than a first predetermined threshold or when the second period of time is longer than a second predetermined threshold.

11. The wireless communication device of claim 10, wherein, when the first period of time is not longer than the first predetermined threshold or when the second period of time is not longer than the second predetermined threshold, the controller is further configured to continue to transmit subsequent packets of the data flow over the first connection.

12. The wireless communication device of claim 8, wherein the controller is further configured to determine a third period of time from the start of the packet transmission over the first connection via the first wireless transceiver to reception of the packet by the router, and the second period of time is determined based on the sum of the first period of time and the third period of time.

13. A method for multipath communications using a plurality of wireless technologies, executed by a wireless communication device comprising a wireless transceiver, the method comprising:

determining a first period of time from reception of a request for transmitting a packet of data flow by the wireless transceiver to a start of the packet transmission over a first connection via the wireless transceiver, or a second period of time from reception of the request for transmitting the packet of the data flow by the first wireless transceiver to reception of the packet by a router; and activating a multipath communication protocol, based on the first period of time or the second period of time, for transmitting subsequent packets of the data flow over both the first connection and a second connection, wherein the first connection and the second connection are established using different wireless technologies.

14. The method of claim 13, wherein the activation of the multipath communication protocol is performed when the first period of time is longer than a first predetermined threshold or when the second period of time is longer than a second predetermined threshold.

15. The method of claim 14, further comprising:

continuing to transmit subsequent packets of the data flow over the first connection, when the first period of time is not longer than the first predetermined threshold or when the second period of time is not longer than the second predetermined threshold.

16. The method of claim 13, further comprising:

determining a third period of time from the start of the packet transmission over the first connection via the wireless transceiver to reception of the packet by the router, and the second period of time is determined based on the sum of the first period of time and the third period of time.

17. The method of claim 13, wherein the first period of time is determined according to at least one of the following parameters of the wireless transceiver:

availability of a channel suitable for the packet transmission; and availability of a time slice configured for the packet transmission.

18. The method of claim 13, wherein the multipath communication protocol is a MultiPath Transmission Control Protocol (MPTCP) or a MultiPath User Datagram Protocol (MPUDP).

19. The method of claim 13, wherein either the first wireless technology or the second wireless technology is a telecommunication technology, and the other of the first wireless technology or the second wireless technology is a Short-Range Wireless (SRW) technology.

20. The method of claim 19, wherein the telecommunication technology is a Long Term Evolution (LTE)-based technology, and the SRW technology is a Wireless-Fidelity (Wi-Fi) technology.

* * * * *